US010655043B2

(12) United States Patent
Fu et al.

(10) Patent No.: US 10,655,043 B2
(45) Date of Patent: May 19, 2020

(54) COMPOSITIONS AND METHODS FOR SERVICING SUBTERRANEAN WELLS

(71) Applicant: SCHLUMBERGER TECHNOLOGY CORPORATION, Sugar Land, TX (US)

(72) Inventors: Diankui Fu, Kuala Lumpur (MY); Bipin Jain, Kuala Lumpur (MY)

(73) Assignee: Schlumberger Technology Corporation, Sugar Land, TX (US)

( * ) Notice: Subject to any disclaimer, the term of this patent is extended or adjusted under 35 U.S.C. 154(b) by 69 days.

(21) Appl. No.: 15/752,018

(22) PCT Filed: Aug. 11, 2015

(86) PCT No.: PCT/MY2015/000065
§ 371 (c)(1),
(2) Date: Feb. 12, 2018

(87) PCT Pub. No.: WO2017/026885
PCT Pub. Date: Feb. 16, 2017

(65) Prior Publication Data
US 2018/0230356 A1   Aug. 16, 2018

(51) Int. Cl.
| | | |
|---|---|---|
| C09K 8/52 | (2006.01) | |
| E21B 37/00 | (2006.01) | |
| E21B 33/14 | (2006.01) | |
| C09K 8/40 | (2006.01) | |
| C09K 8/467 | (2006.01) | |
| C04B 28/02 | (2006.01) | |
| E21B 37/06 | (2006.01) | |

(52) U.S. Cl.
CPC ............ *C09K 8/40* (2013.01); *C04B 28/02* (2013.01); *C09K 8/467* (2013.01); *C09K 8/52* (2013.01); *E21B 33/14* (2013.01); *E21B 37/00* (2013.01); *E21B 37/06* (2013.01); *C09K 2208/08* (2013.01)

(58) Field of Classification Search
CPC . E21B 37/00; E21B 7/20; E21B 21/00; E21B 33/14; E21B 33/13; C09K 8/52
See application file for complete search history.

(56) References Cited

U.S. PATENT DOCUMENTS 5,377,760 A * 1/1995 Merrill ................... C09K 8/512
166/295
6,016,872 A * 1/2000 Davis ..................... C09K 8/035
166/312

(Continued)

FOREIGN PATENT DOCUMENTS

EP    2305767 A1    4/2011

OTHER PUBLICATIONS

Piot et al., "Primary Cementing Techniques", in Nelson EB and Guillot D (eds), Well Cementing—2nd Edition, Houston, Schlumberger (2006), pp. 459-501.

(Continued)

*Primary Examiner* — Kenneth L Thompson

(57) ABSTRACT

Aqueous fluids containing hydrophobic particles are effective media for cleaning water-base drilling fluids and drilling fluid solids from the interior surface of a casing string. Hydrophobic fibers may be added to a drilling fluid, a spacer fluid, a chemical wash, or combinations thereof. The disclosed fluids may be employed during primary cementing operations where it is not possible to use a bottom plug.

20 Claims, 6 Drawing Sheets

(56) References Cited

U.S. PATENT DOCUMENTS

| | | | |
|---|---|---|---|
| 7,267,173 B2* | 9/2007 | Daccord | C04B 14/48 |
| | | | 106/644 |
| 9,909,048 B2* | 3/2018 | Biddle | C09K 8/516 |
| 9,957,432 B2* | 5/2018 | Galindo | E21B 43/25 |
| 10,161,222 B2* | 12/2018 | Fu | E21B 33/138 |
| 2005/0230114 A1 | 10/2005 | Eoff et al. | |
| 2006/0240994 A1 | 10/2006 | Eoff et al. | |
| 2008/0173448 A1 | 7/2008 | Nguyen et al. | |
| 2012/0305250 A1* | 12/2012 | Burts, Jr. | C04B 26/28 |
| | | | 166/292 |
| 2013/0048285 A1 | 2/2013 | Boulard et al. | |
| 2014/0274815 A1* | 9/2014 | Lovett | C04B 16/0625 |
| | | | 507/118 |
| 2014/0290958 A1 | 10/2014 | Marr et al. | |
| 2014/0338916 A1 | 11/2014 | Vasquez et al. | |
| 2016/0122620 A1* | 5/2016 | Fu | C09K 8/536 |
| | | | 166/293 |
| 2018/0346792 A1* | 12/2018 | Fu | C09K 8/52 |

OTHER PUBLICATIONS

Daccord et al., "Mud Removal", in Nelson EB and Guillot D (eds.), Well Cementing—2nd Edition, Houston, Schlumberger (2006), pp. 143-189.

Office Action issued in the corresponding EA application 201890470, dated Feb. 26, 2019 (10 pages).

Office Action issued in the corresponding EA application 201890470, dated Dec. 5, 2019 (5 pages).

\* cited by examiner

COMPOSITIONS AND METHODS FOR SERVICING SUBTERRANEAN WELLS

BACKGROUND

The statements in this section merely provide background information related to the present disclosure and may not constitute prior art.

This disclosure relates to compositions and methods for removing drilling fluids from a subterranean wellbore.

During the construction of subterranean wells, it is common, during and after drilling, to place a tubular body in the wellbore. The tubular body may comprise drillpipe, casing, liner, coiled tubing or combinations thereof. The purpose of the tubular body is to act as a conduit through which desirable fluids from the well may travel and be collected. The tubular body is normally secured in the well by a cement sheath. The cement sheath provides mechanical support and hydraulic isolation between the zones or layers that are penetrated by the well. The latter function prevents hydraulic communication between zones that may result in contamination. For example, the cement sheath blocks fluids from oil or gas zones from entering the water table and polluting drinking water. In addition, to optimize a well's production efficiency, it may be desirable to isolate, for example, a gas-producing zone from an oil-producing zone. The cement sheath achieves hydraulic isolation because of its low permeability. In addition, intimate bonding between the cement sheath and both the tubular body and borehole may prevent leaks.

The cement sheath is placed in the annular region between the outside of the tubular body and the subterranean borehole wall by pumping the cement slurry down the interior of the tubular body, out the bottom and up into the annulus. The cement slurry may also be placed by the "reverse cementing" method, whereby the slurry is pumped directly down into the annular space. During the cementing process, the cement slurry is frequently preceded by a spacer fluid or chemical wash to prevent commingling with drilling fluid in the wellbore. These fluids also help clean the tubular-body and formation surfaces, promoting better cement bonding and zonal isolation. The cement slurry may also be followed by a displacement fluid such as water, a brine or drilling fluid. This fluid may reside inside the tubular body after the cementing process is complete. Hereinafter, the word "casing" will be considered to be equivalent to "tubular body." A complete description of the cementing process and the use of spacer fluids and chemical washes is presented in the following publications.

Piot B and Cuvillier G: "Primary Cementing Techniques," in Nelson E B and Guillot D (eds.): *Well Cementing—2nd Edition*, Houston, Schlumberger (2006): 459-501.

Daccord G, Guillot D and Nilsson F: "Mud Removal," in Nelson E B and Guillot D (eds.) *Well Cementing—2nd Edition*, Houston, Schlumberger (2006): 143-189.

Most primary cementing operations employ a two-plug cement placement method (see FIGS. 1A-1D). After drilling through an interval to a desired depth, the drillpipe is removed, leaving the borehole 101 filled with drilling fluid 102. A casing string 103 is lowered to the bottom of the borehole, forming an annulus 104 between the casing string and the borehole (FIG. 1A). The bottom end of the casing string is protected by a guide shoe or float shoe 105. Both shoes are tapered, commonly bullet-nosed devices that guide the casing toward the center of the hole to minimize contact with rough edges or washouts during installation. The guide shoe differs from the float shoe in that the former lacks a check valve. The check valve can prevent reverse flow, or U-tubing, of fluids from the annulus into the casing. Centralizers 106 are placed along casing sections to help prevent the casing from sticking while it is lowered into the well. In addition, centralizers keep the casing in the center of the borehole to help ensure placement of a uniform cement sheath in the annulus between the casing and the borehole wall.

As the casing 103 is lowered into the well, the casing interior may fill with drilling fluid 102. The objectives of the primary cementing operation are to remove drilling fluid from the casing interior and borehole, place a cement slurry in the annulus and fill the casing interior with a displacement fluid such as drilling fluid, brine or water.

Cement slurries and drilling fluids are often chemically incompatible. Commingling these fluids may result in a thickened or gelled mass at the interface that would be difficult to remove from the wellbore, possibly preventing placement of a uniform cement sheath throughout the annulus. Therefore, a chemical and physical means may be employed to maintain fluid separation. Chemical washes 107 and spacer fluids 108 may be pumped after the drilling fluid and before the cement slurry 109 (FIG. 1B). These fluids have the added benefit of cleaning the casing and formation surfaces, which helps achieve good cement bonding.

Wiper plugs are elastomeric devices that provide a physical barrier between fluids pumped inside the casing. A bottom plug 110 separates the cement slurry from the drilling fluid, and a top plug 111 separates the cement slurry from a displacement fluid 112 (FIG. 1C). The bottom plug has a membrane 113 that ruptures when it lands at the bottom of the casing string, creating a pathway through which the cement slurry may flow into the annulus. The top plug 111 does not have a membrane; therefore, when it lands on top of the bottom plug, hydraulic communication is severed between the casing interior and the annulus (FIG. 1D). After the cementing operation, engineers wait for the cement to cure, set and develop strength—known as waiting on cement (WOC). After the WOC period additional drilling, perforating or other operations may commence.

Another purpose of a bottom plug is to scrape stationary drilling fluid or drilling fluid solids from the casing interior, leaving a clean casing interior surface and pushing the drilling fluid material out of the casing and into the annulus.

There are certain primary cementing situations where it is not possible to launch a bottom plug as a separator between the cement slurry and the fluids that have been previously pumped into the wellbore. Such operations include two-stage cement jobs and liner cementing. If a bottom plug is not present, a layer of drilling fluid and drilling fluid solids may remain along the interior casing surface. As the cement slurry passes by the casing surface, drilling fluid material may become incorporated in (or commingle with) the cement slurry, and such contamination may cause chemical and rheological difficulties.

Furthermore, as the top plug travels down the casing interior, it wipes the casing surface clean and the drilling fluid material that may accumulate below the top plug could further contaminate the cement slurry. At the end of displacement, most of this contaminated cement slurry may come to rest in the annular space between the float collar and float shoe, thereby severely compromising the mechanical properties of the cement.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The present disclosure describes improved compositions for removing stationary water-base drilling fluids and drilling fluid solids from the interior surfaces of tubular bodies. Aqueous treatment fluids including spacer fluids and chemical washes are provided that have the ability to remove the unwanted drilling fluid material from the interior surfaces of casing strings.

In an aspect, embodiments relate to methods for cleaning an interior of a casing string. A subterranean borehole is drilled with a water-base drilling fluid. A casing string is then lowered into the borehole, thereby filling the casing string interior with the drilling fluid. An aqueous treatment fluid is then provided that comprises water and hydrophobic fibers. The treatment fluid is pumped through the casing string interior, thereby removing the drilling fluid from the casing interior.

In a further aspect, embodiments relate to methods for cleaning a wellbore in a subterranean well that has been drilled with a water-base drilling fluid. An aqueous treatment fluid is provided that comprises water and hydrophobic fibers. The treatment fluid is circulated in the wellbore and then removed from the wellbore.

In yet a further aspect, embodiments relate to methods for cementing a subtereanean well having a wellbore that has been drilled with a water-base drilling fluid. A casing string is placed inside the wellbore, thereby forming an annulus between an outer surface of the casing string and a wellbore wall. An aqueous treatment fluid is provided that comprises water and hydrophobic fibers. The treatment fluid is then pumped into and through an interior of the casing string, wherein the treatment fluid is not preceded by a bottom plug. The treatment fluid is then removed from the casing interior. A cement slurry is then provided and placed in the annulus between an outer surface of the casing and the wellbore wall.

DETAILED DESCRIPTION

Figure 1A:
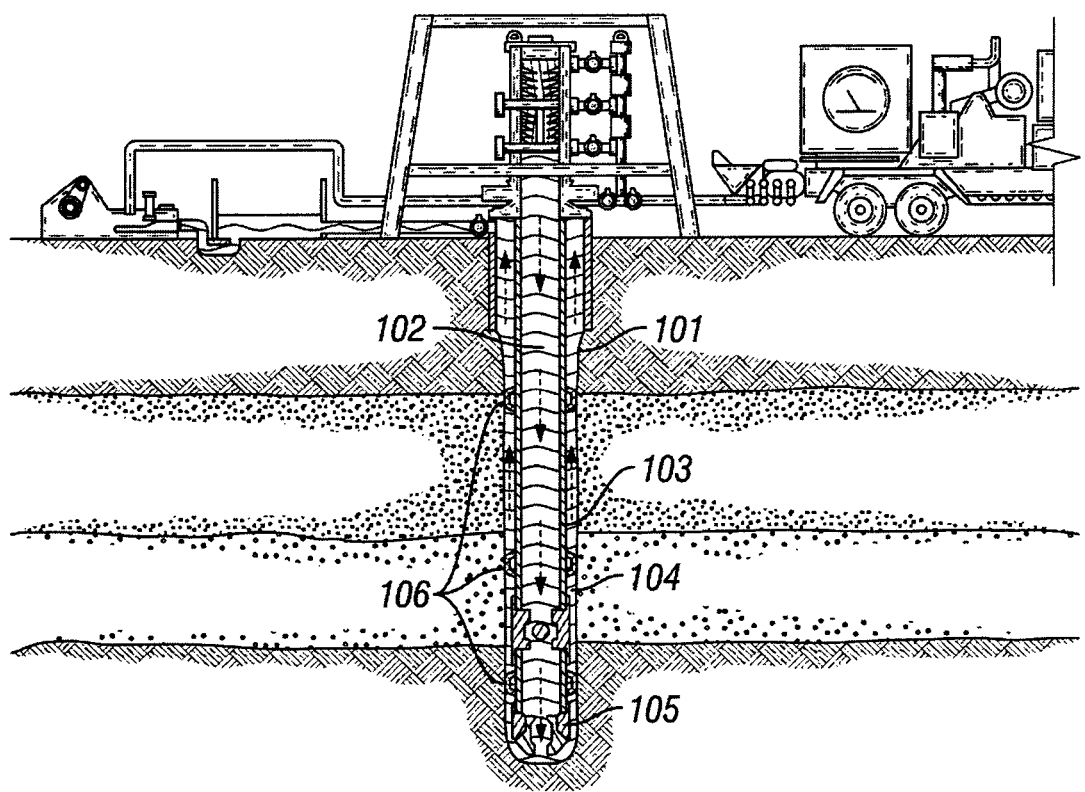
FIGS. 1A-1D depict the sequence of events that take place during a primary cementing operation that employs the two-plug method.
Figure 1B:
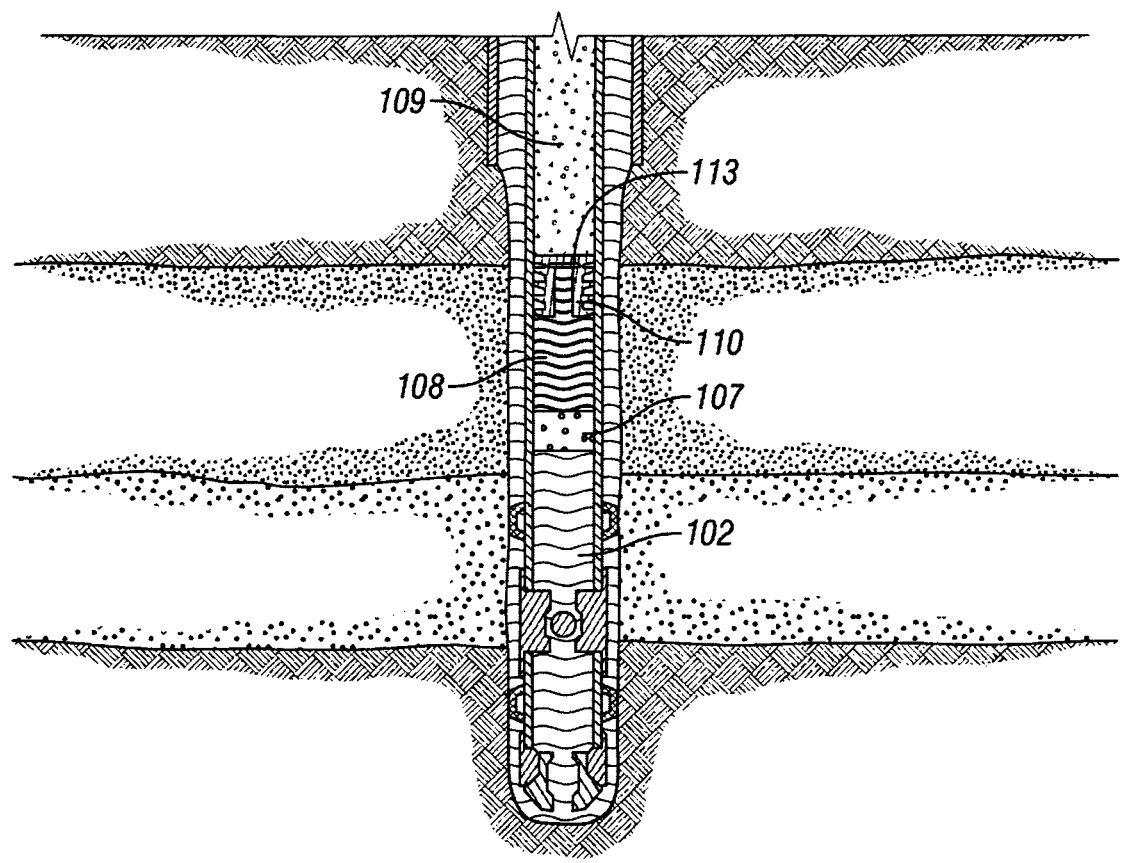
Figure 1C:
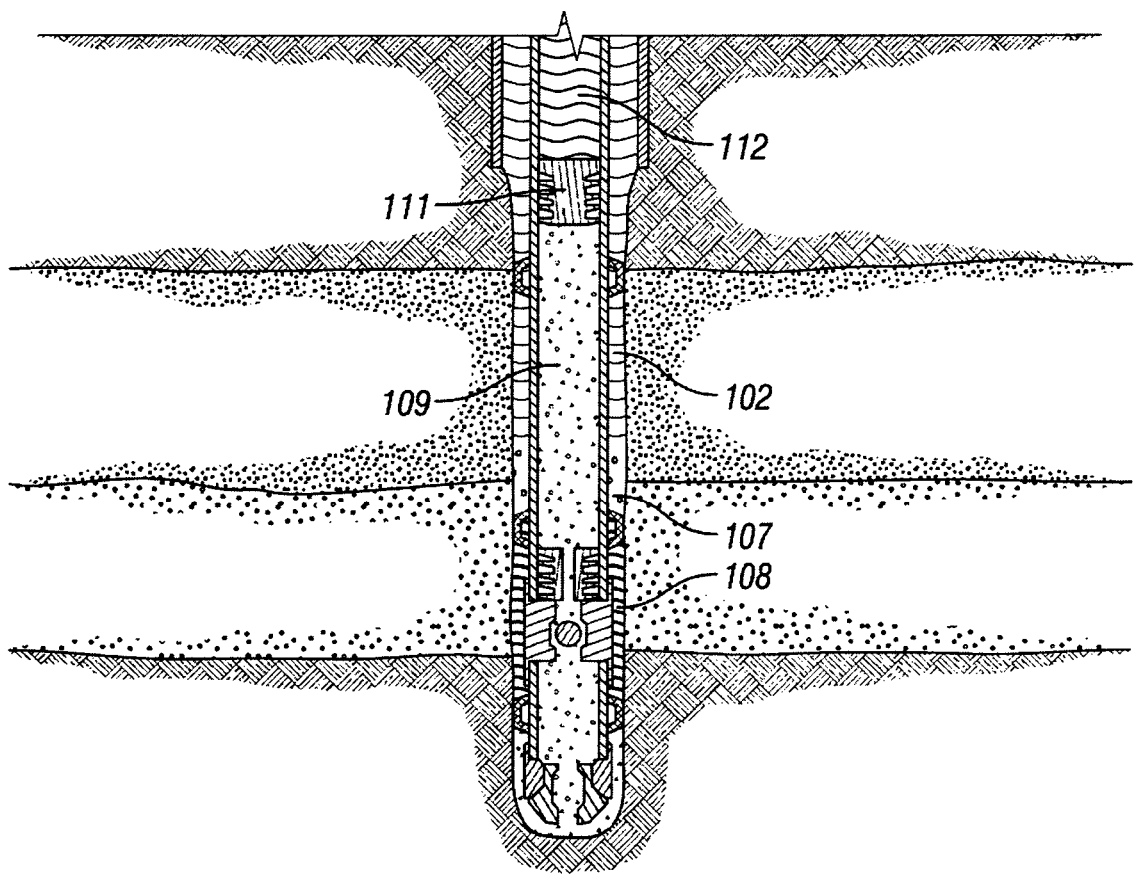
Figure 1D:
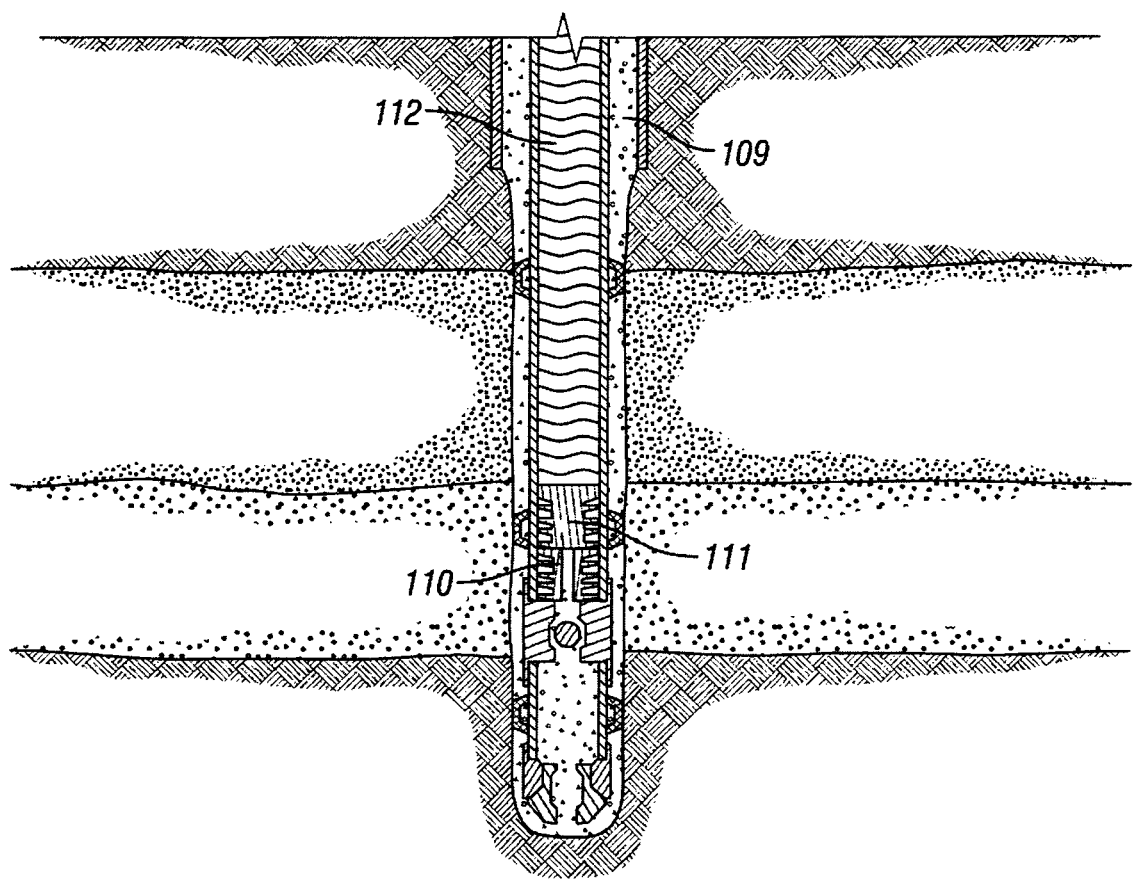

At the outset, it should be noted that in the development of any such actual embodiment, numerous implementation—specific decisions are made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the disclosure and this detailed description, each numerical value should be read once as modified by the term "about" (unless already expressly so modified), and then read again as not so modified unless otherwise indicated in context. The term about should be understood as any amount or range within 10% of the recited amount or range (for example, a range from about 1 to about 10 encompasses a range from 0.9 to 11). Also, in the summary and this detailed description, it should be understood that a concentration range listed or described as being useful, suitable, or the like, is intended that any concentration within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, even if specific data points within the range, or even no data points within the range, are explicitly identified or refer to a few specific, it is to be understood that inventors appreciate and understand that any data points within the range are to be considered to have been specified, and that inventors possessed knowledge of the entire range and the points within the range.

Embodiments relate to compositions and methods for cleaning casing surfaces coated with a water-base drilling fluid and drilling fluid solids. Such compositions may also be used to clean wellbore surfaces coated with a water-base drilling fluid and drilling fluid solids.

In an aspect, embodiments relate to methods for cleaning an interior of a casing string. A subterranean borehole is drilled with a water-base drilling fluid. A casing string is then lowered into to borehole, thereby filling the casing string interior with the drilling fluid. An aqueous treatment fluid is then provided that comprises water and hydrophobic fibers. The treatment fluid is pumped through the casing string interior, thereby removing the drilling fluid from the casing interior.

In a further aspect, embodiments relate to methods for cleaning a wellbore in a subterranean well that has been drilled with a water-base drilling fluid. An aqueous treatment fluid is provided that comprises water and hydrophobic fibers. The treatment fluid is circulated in the wellbore and then removed from the wellbore.

In yet a further aspect, embodiments relate to methods for cementing a subterranean well having a wellbore that has been drilled with a water-base drilling fluid. A casing string is placed inside the wellbore, thereby forming an annulus between an outer surface of the casing string and a wellbore wall. An aqueous treatment fluid is provided that comprises water and hydrophobic fibers. The treatment fluid is then pumped into and through an interior of the casing string, wherein the treatment fluid is not preceded by a bottom plug. The treatment fluid is then removed from the casing string interior. A cement slurry is then provided and placed in the annulus between an outer surface of the casing and the wellbore wall. The cement slurry may further comprise the same hydrophobic solids as those in the aqueous treatment fluid.

For all aspects, the cement slurry may comprise portland cement, calcium aluminate cement, lime/silica mixtures, fly ash, blast furnace slag, zeolites, geopolymers or chemically bonded phosphate ceramics or combinations thereof. The cement slurry may further comprise additives comprising accelerators, retarders, extenders, weighting agents, fluid-loss additives, dispersants, nitrogen, air, gas generating agents, antifoam agents or lost circulation agents or combinations thereof.

For all aspects, the hydrophobic fibers may comprise polyester fibers, polyalkene fibers or polyamide fibers or combinations thereof. The polyester fibers may be derived from polylactic acid. The polyester fibers may be derived from polylactic acid. The polyester fibers may comprise polyglycolide or polyglycolic acid (PGA), polylactic acid (PLA), polycaprolactone (PCL), polyhydroxyalkanoate (PHA), polyhydroxybutyrate (PHB), polyethylene adipate (PEA), polybutylene succinate (PBS), poly(3-hydroxybutyrate-co-3-hydroxyvalerate) (PHBV), polyethylene terephthalate (PET), polybutylene terephthalate (PBT), polytrimethylene terephthalate (PTT) or Polyethylene naphthalate (PEN) or combinations thereof. The polyester fibers may comprise Short Cut PLA Staple, available from Fiber Innovation Technology, Johnson City, Tenn., USA.

The polyamide fibers may comprise NYLON-6, NYLON-11, NYLON-12, NYLON-6,6, NYLON-4,10, NYLON-5,10, PA6/66 DuPont ZYTEL [21]), PA6/6T BASF ULTRAMID T [22]), PA6I/6T DuPont SELAR PA [23], PA66/6T DuPont ZYTEL HTN or PA4T DSM Four Tii or combinations thereof.

For all aspects, the fibers may have a diameter between 1 micron and 50 microns, or between 5 microns and 30 microns or between 10 microns and 15 microns. The fibers may have a length between 2 mm and 20 mm, or between 4 mm and 12 mm or between 6 mm and 8 mm. The fibers may be present at a concentration between 0.6 kg/m$^3$ and 14 kg/m$^3$, or between 1.2 kg/m$^3$ and 10 kg/m$^3$ or between 3 kg/m$^3$ and 8 kg/m$^3$.

For all aspects, the fibers may be crimped. For this disclosure, crimps are defined as undulations, waves or a succession of bends, curls and waves in a fiber strand. The crimps may occur naturally, mechanically or chemically. Crimp has many characteristics, among which are its amplitude, frequency, index and type. For this disclosure, crimp is characterized by a change in the directional rotation of a line tangent to the fiber as the point of tangent progresses along the fiber. Two changes in rotation constitute one unit of crimp. Crimp frequency is the number of crimps or waves per unit length of extended or straightened fiber. Another parameter is the crimping ratio, K1 (Eq. 1).

$$K1 = \frac{Lv - Lk}{Lv}, \quad \text{(Eq. 1)}$$

where Lk is the length of the crimped fiber in the relaxed, released state; and Lv is the length of the same fiber in the stretched state (i.e., the fiber is practically rectilinear without any bends).

For this disclosure, the fibers may have a crimp frequency between 1/cm and 6/cm, or between 1/cm and 5/cm or between 1/cm and 4/cm. The K1 value may be between 2 and 15, or between 2 and 10 or between 2 and 6.

For all aspects, the treatment fluids may further comprise surfactants. The surfactants may comprise anionic surfactants, cationic surfactants, nonionic surfactants or zwitterionic surfactants or combinations thereof. The anionic surfactants may comprise sulfates, sulfonates, phosphates or carboxylates or combinations thereof. The anionic surfactants may comprise ammonium lauryl sulfate, sodium lauryl sulfate, sodium laureth sulfate, sodium myreth sulfate, dioctyl sodium sulfosuccinate, perfluorooctane sulfoantes, perfluorobutanesulfonates, alkylbenzene sulfonates, alkyl-aryl ether phosphates, alkyl ether phosphates, alkyl carboxylates, sarcosinates, perfluorononanoates, or perfluorooctanoates or combinations thereof. The cationic surfactants may comprise primary, secondary or tertiary amines, or quaternary ammonium salts or combinations thereof. The nonionic surfactants may comprise long chain alcohols, ethoxylated alcohols, polyoxyethylene glycol alkyl ethers, polyoxypropylene glycol alkyl ethers, glucoside alkyl ethers, polyoxyethylene glycol octylphenol ethers, polyoxyethylene glycol alklyphenol ethers, glycerol alkyl esters, polyoxyethylene glycol sorbitan alkyl esters, sorbitan alkyl esters, cocamide DEA, cocamide MEA, dodecyldimethylamine oxide, block copolymers of polyethylene glycol or polypropylene glycol, or polyethoxylated tallow amine or combinations thereof. The zwitterionic surfactants may comprise sultaines or betaines or combinations thereof. The surfactants may be present at a concentration between about 0.1 vol % and 50 vol %, or between 0.5 vol % and 30 vol %, or between 1 vol % and 10 vol %.

Figure 2:
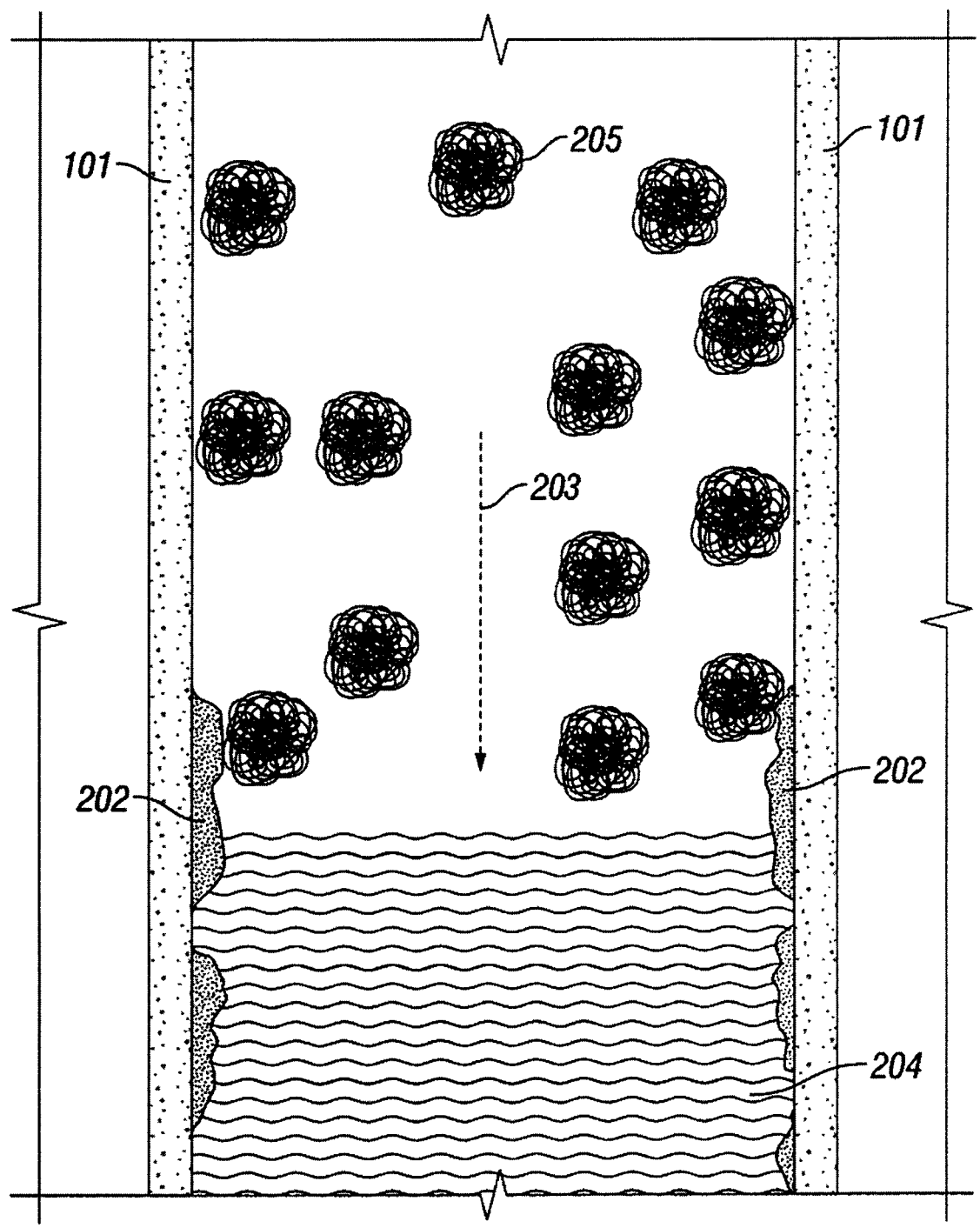
FIG. 2 depicts the disclosed aqueous treatment fluid cleaning the interior surfaces of a casing string.

One non-limiting example of the method is illustrated in FIG. 2. Casing 101 is present in the wellbore, and drilling fluid solids 202 are deposited on its interior surface. The treatment fluid comprising hydrophobic fibers 205 is flowed downward 203 inside the casing, displacing the drilling fluid 204. The hydrophobic nature of the fibers causes the drilling fluid solids to be removed from the casing surface as the treatment fluid down the casing interior.

Figure 3:
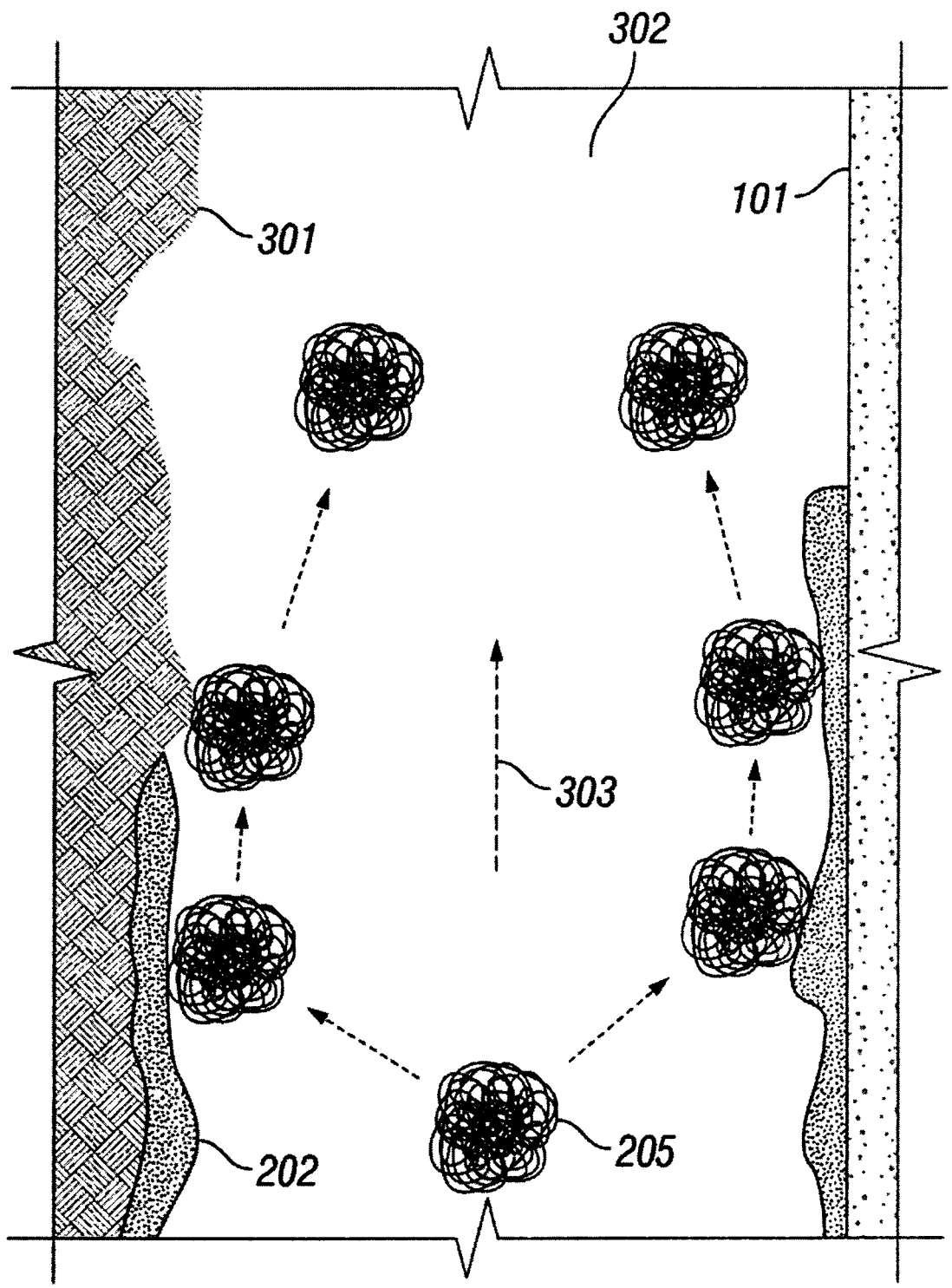
FIG. 3 depicts the disclosed aqueous treatment fluid cleaning the exterior surfaces of a casing string as well as the borehole wall surface.

After the treatment fluid has exited the bottom of the casing string, the fluid may continue to clean the outside surface of the casing 101 and the wellbore surface 301 (FIG. 3). The treatment fluid comprising hydrophobic fibers 205 is flowing upward 303 in the annular space 302. The hydrophobic nature of the fibers causes the drilling fluid solids to be removed from the casing and formation surfaces as the treatment fluid travels up the annulus.

Example 1

The following examples serve to further illustrate the disclosure.

A rotor test was conducted to evaluate the ability of treatment-fluid compositions to remove a water-base mud from casing surfaces. The test equipment was a Chan 35™ rotational rheometer, available from Chandler Engineering, Tulsa, Okla., USA. The rheometer was equipped with an 85-mm diameter cup for tests conducted at 25° C. A closed rotor, 73.30 mm long and 40.70 mm in diameter, was employed to simulate the casing surface. The rotor had a sand blasted stainless-steel surface with an average roughness of 1.4 micrometers.

A water-base drilling fluid, DUO-VIS (available from MI-SWACO, Houston, Tex., USA), was prepared at a density of 1,180 kg/m$^3$. DUO-VIS fluid employs a xanthan-gum biopolymer as a viscosifier. The weighting material was calcium carbonate.

The rotor was lowered into the drilling fluid and allowed to remain stationary for 10 min. When the rotor was removed, a smooth and homogenous layer of drilling fluid covered the rotor. The rotor remained stationary for 2 min to allow excess drilling fluid to drip off. The rotor was then placed in a test fluid and rotated at 100 RPM for 2 min. After the rotation period the rotor was removed and visually inspected for drilling fluid remaining on the rotor surface.

The first fluid in which the rotor was lowered was water. After the rotation period and the removal of the rotor, drilling fluid was still observed coating the rotor surface.

The second fluid in which the rotor was lowered was water containing 0.28 kg/L hydrophobic fibers. The fiber was Short Cut PLA Staple, available from Fiber Innovation Technology, Johnson City, Tenn., USA. The fiber length and diameter were 6 mm and 12 micrometers, respectively. After the rotation period and the removal of the rotor, the rotor surface was clean with no traces of drilling fluid present.

Although a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims.

The invention claimed is:

1. A method, comprising:
 (i) drilling a subterranean borehole with a water-base drilling fluid;
 (ii) lowering the casing string into the borehole, thereby filling a casing string interior with the drilling fluid;
 (iii) providing an aqueous treatment fluid comprising water and hydrophobic fibers; and
 (iv) pumping the treatment fluid through the casing string interior and in an annular space, thereby removing the drilling fluid from the casing interior and wellbore surface without use of a plug.

2. The method of claim 1, wherein the hydrophobic fibers comprise polyester fibers, polyalkene fibers, polyamide fibers or combinations thereof.

3. The method of claim 2, wherein the polyester fibers are derived from polylactic acid.

4. The method of claim 1, wherein the hydrophobic fibers are crimped.

5. The method of claim 2, wherein the hydrophobic fibers have a diameter between 1 micrometer and 50 micrometers, and a length between 2 mm and 20 mm.

6. The method of claim 1, wherein the treatment fluid further comprises one or more surfactants, the one or more surfactants comprising anionic, cationic, nonionic or zwitterionic surfactants or combinations thereof.

7. A method for cleaning a wellbore in a subterranean well that has been drilled with a water-base drilling fluid, comprising:
 (i) providing an aqueous treatment fluid comprising water and hydrophobic fibers;
 (ii) circulating the treatment fluid in the wellbore; and
 (iii) removing the treatment fluid from an interior of a casing and formation surfaces of the wellbore without use of a plug.

8. The method of claim 7, wherein the hydrophobic fibers comprise polyester fibers, polyalkene fibers, polyamide fibers or combinations thereof.

9. The method of claim 8, wherein the polyester fibers are derived from polylactic acid.

10. The method of claim 7, wherein the fibers are crimped.

11. The method of claim 7, wherein the hydrophobic fibers have a diameter between 1 micrometer and 50 micrometers, and a length between 2 mm and 20 mm.

12. The method of claim 7, wherein the aqueous treatment fluid further comprises one or more surfactants, the one or more surfactants comprising anionic, cationic, nonionic or zwitterionic surfactants or combinations thereof.

13. The method of claim 7, wherein the aqueous treatment fluid comprises a drilling fluid, a spacer fluid, a chemical wash, a cement slurry, or combinations thereof.

14. A method for cementing a subterranean well having a wellbore that has been drilled with a water-base drilling fluid, comprising:
 (i) placing a casing string inside the wellbore, thereby forming an annulus between an outer surface of the casing string and a wellbore wall;
 (ii) providing an aqueous treatment fluid comprising water and hydrophobic fibers;
 (iii) pumping the treatment fluid into and through an interior of the casing string, wherein the treatment fluid is not preceded by a bottom plug;
 (iv) removing the treatment fluid from the interior of the casing string and formation surfaces of the wellbore without use of a plug;
 (v) providing a cement slurry; and
 (vi) placing the cement slurry in the annulus between the outer surface of the casing string and the wellbore wall.

15. The method of claim 14, wherein the hydrophobic fibers comprise polyester fibers, polyalkene fibers, polyamide fibers or combinations thereof.

16. The method of claim 15, wherein the polyester fibers are derived from polylactic acid.

17. The method of claim 15, wherein the fibers are crimped.

18. The method of claim 15, wherein the hydrophobic fibers have a diameter between 1 micrometer and 50 micrometers, and a length between 2 mm and 20 mm.

19. The method of claim 14, wherein the cement slurry further comprises hydrophobic solids.

20. The method of claim 14, wherein the aqueous treatment fluid comprises a drilling fluid, a spacer fluid, a chemical wash, or a cement slurry, or combinations thereof.

* * * * *